(12) United States Patent
Yousfan et al.

(10) Patent No.: US 8,800,969 B2
(45) Date of Patent: Aug. 12, 2014

(54) DEVICE AND METHOD FOR DISSOLVING GAS INTO A LIQUID

(75) Inventors: Gil Yousfan, Herzliya (IL); Ronen-Itzhak Shechter, Kiryat Tivon (IL)

(73) Assignee: Diffusaire Ltd, Netanya (IL)

( * ) Notice: Subject to any disclaimer, the term of this patent is extended or adjusted under 35 U.S.C. 154(b) by 316 days.

(21) Appl. No.: 13/148,612

(22) PCT Filed: Feb. 9, 2010

(86) PCT No.: PCT/IL2010/000114
§ 371 (c)(1),
(2), (4) Date: Aug. 9, 2011

(87) PCT Pub. No.: WO2010/092569
PCT Pub. Date: Aug. 19, 2010

(65) Prior Publication Data
US 2011/0309034 A1    Dec. 22, 2011

Related U.S. Application Data

(60) Provisional application No. 61/207,144, filed on Feb. 10, 2009.

(51) Int. Cl.
*B01F 3/04*    (2006.01)
(52) U.S. Cl.
USPC ......... 261/26; 261/36.1; 261/121.1; 261/124; 261/126; 210/220
(58) Field of Classification Search
USPC ......... 210/220; 261/121.1, 124, 126, 26, 36.1
See application file for complete search history.

(56) References Cited

U.S. PATENT DOCUMENTS

| | | | |
|---|---|---|---|
| 3,643,403 A | 2/1972 | Speece | |
| 4,000,227 A | 12/1976 | Garrett | |
| 4,043,771 A | 8/1977 | Anand | |
| 4,066,722 A | 1/1978 | Pietruszewski et al. | |
| 4,163,712 A | 8/1979 | Smith | |

(Continued)

FOREIGN PATENT DOCUMENTS

| | | |
|---|---|---|
| AT | 381 689 B | 4/1986 |
| CN | 1086194 A | 5/1994 |

(Continued)

OTHER PUBLICATIONS

The International Search Report and Written Opinion for International Application No. PCT/IL2010/000114, fourteen pages, mailed Jun. 24, 2010.

(Continued)

*Primary Examiner* — Robert A Hopkins
(74) *Attorney, Agent, or Firm* — Vorys, Sater, Seymour and Pease LLP; Susanna M. Hopkins (57) ABSTRACT

Provided is a system for dissolving gas into liquid contained within a body. The system may include a tubular body extending between a bottom end and a top end, a gas diffuser coupleable to a gas source and configured for discharging gas bubbles into the tubular body, and a liquid pump for propelling liquid within the tubular body in a downwards direction, against uprising gas bubbles, where the liquid egresses at the bottom end of the tubular body.

27 Claims, 11 Drawing Sheets

(56) References Cited

U.S. PATENT DOCUMENTS

| | | | |
|---|---|---|---|
| 4,187,263 A | 2/1980 | Lipert |
| 4,477,393 A | 10/1984 | Kos |
| 4,752,421 A | 6/1988 | Makino |
| 5,509,955 A | 4/1996 | Garrett et al. |
| 5,741,443 A | 4/1998 | Gemza |
| 5,783,118 A | 7/1998 | Kolaini |
| 6,503,403 B2 | 1/2003 | Green et al. |

FOREIGN PATENT DOCUMENTS

| | | |
|---|---|---|
| CN | 101052460 A | 10/2007 |
| DE | 78 02 091 U1 | 1/1978 |
| DE | 38 26 955 A1 | 2/1990 |
| DE | 20 2004 002 243 U1 | 5/2004 |
| EP | 0 826 640 A2 | 3/1998 |
| EP | 1 369 386 A2 | 12/2003 |
| FR | 2671456 A1 * | 7/1992 |
| GB | 2 089 790 A | 6/1982 |
| JP | 52-3571 | 1/1977 |
| WO | 2006/038298 A1 | 4/2006 |
| WO | 2006/127979 A2 | 11/2006 |
| WO | 2008/102784 A1 | 8/2008 |

OTHER PUBLICATIONS

Treybal, R. E., Mass-Transfer Operations—Equipment for Gas-Liquid Operations, pp. 188-193, New York, St. Louis : Mcgraw-Hill Book Company, 1980.

* cited by examiner

DEVICE AND METHOD FOR DISSOLVING GAS INTO A LIQUID

This is a National Phase Application filed under 35 U.S.C. § 371 as a national stage of PCT/IL2010/000114, filed on Feb. 9, 2010, an application claiming the benefit under 35 U.S.C. § 119(e) of U.S. Provisional Application No. 61/207,144, filed on Feb.10, 2009, the content of each of which is hereby incorporated by reference in its entirety.

FIELD OF THE INVENTION

The present disclosed subject matter relates to a device and a method for facilitating dissolving of gaseous fluids into liquids.

BACKGROUND OF THE INVENTION

Dissolving of gasses into liquids is a process in which gas is dissolved into liquid, for various purposes and processes in different industries (e.g. chemical industry, agriculture), environmental control (e.g. treating of waste liquids, etc.), and the like. The term dissolving is at times referred to also as diffusing.

Dissolving air into liquid is a common process of enriching the liquid with Oxygen by which more oxygen is provided than can be supplied by the natural rate of aeration, for example in fish farms, waste water treatment, etc., where the amount of Oxygen dissolved into the liquid is increased, for consumption by living organisms.

U.S. Pat. No. 4,752,421 discloses a method for use with an apparatus which produces jets of water through a vertical water diffuser tube by supplying individually formed air bubble masses at regular intervals, which are followed by the water being drawn under the action of the air bubble masses. The method improves the water processing efficiency and ability of the apparatus by defining the volumetric quantity of a formed air mass in relation to the diameter of the particular air diffuser tube and defining a certain relationship between the length L (m) of the tube through which the rises and the time interval T (sec) at which the individual air bubble masses are produced.

GB 2059790A discloses an apparatus for combining a liquid and a gas includes a pump for circulating the liquid in tank which includes means for maintaining a constant liquid depth d, liquid from the pump being delivered to the nozzle of an injector pump having a gas inlet, the gas liquid mixture being returned to the tank by a mixing pipe. The cross-sectional area Am of the mixing pipe and the cross-sectional area An of the nozzle are selected so that the ratio Am/An lies between 1.5 and 12, the upper limit of this ratio decreasing with an increase in the liquid depth d from 2 to 8 meters.

EP 0826640A discloses a water oxygenating device comprising an upright tubular body mounted on a base close to the bottom of a body of water and having upper and lower ends open to enable water to flow upwardly therethrough. Air lift nozzles and fine bubble dispersion air supply annular pipes serve to generate a flow of bubbles upwardly through the tubular body, the fine dispersion of air bubbles effecting enhanced oxygen transfer into the water throughout passage around a pair of shallow helical flights having an angle of approximately 10 DEG to the horizontal. The fine bubble air dissolving commences outside of the tubular body to provide a gentle mixing action and thus maximum oxygen transfer within the tube where the water and oxygen interface is retained for as long as possible.

U.S. Pat. No. 4,187,263 is directed to an apparatus for causing circulation within a large body of fluid. The apparatus comprises a "large bubble" generator exposed to the pressure of the fluid at a predetermined level, a vertically extending standpipe, an inverted siphon between the standpipe and the generator, and a transverse connection between the standpipe and a vertically extending stackpipe. Upon generating a large gas bubble into the stackpipe, the gas acts as a piston within the stackpipe, pushing liquid upwardly therethrough, and thereby drawing liquid into the bottom. The continuous passage of such large bubbles through the stackpipe results in a current flow circulation through the large standing body of liquid. The advantage of the present type of large bubble generator, is that the generator can be placed at a position beneath the surface of the standing body of liquid a distance limited only by the rapidity at which a large bubble can be generated, as it is desirable that in steady state operation, a large bubble enter the stackpipe before the preceding large bubble has exited from the top.

SUMMARY OF THE INVENTION

According to the present disclosed subject matter there is disclosed a system and a method for dissolving gaseous matter into a liquid contained in a liquid body.

The term liquid body as used herein the specification and claims is used to denote any sort of liquid containing vessel or reservoir, natural or artificial. Examples of such liquid bodies are ponds, lakes, tanks, containers, and the like.

The terms gas and gaseous matter denote any as including, but not limited to ambient air, Oxygen, Nitrogen, Carbon-dioxide, etc.

The term gas source denotes any source of gas such as a gas source, compressed gas containers, etc.

The term dissolving gas denotes dissolving any one or more component or constituent of a gas stream being bubbled into a liquid.

The disclosed subject matter is aimed at a system for dissolving gas into a liquid, the system comprising a tubular body extending between a bottom end and a top end, a gas diffuser coupleable to a gas source configured for discharging gas bubbles into the tubular body, and a liquid pump for propelling liquid within the tubular body in a downwards direction, against uprising gas bubbles, where said liquid egresses at the bottom end of the tubular body.

According to another aspect of the present disclosed subject matter there is disclosed a method for dissolving a gas into a liquid, the method involving discharging gas bubbles into a tubular body extending between a bottom end and a top end and propelling the liquid within the tubular body in a downwards direction, against the uprising gas bubbles.

The method comprises the following steps:
 (a) obtaining a rigid tubular body with a liquid inlet port near a top end thereof and a liquid outlet port at a bottom end, both being in flow communication with the liquid body;
 (b) discharging gas bubbles into the tubular body;
 (c) propelling the liquid within the tubular body in a downwards direction, against the uprising gas bubbles; and
 (d) discharging liquid to the liquid body through the outlet port.

The tubular body is either substantially immersed within the liquid body, or the tubular body is external to the liquid body and where a liquid inlet port and a liquid outlet port of the tubular body are in flow communication with the liquid body by suitable liquid conduits.

In operation, the liquid is pumped and propelled downwardly, within the tubular body, against gas bubbles which emerge substantially upwardly, towards the top end of the tubular body, owing to buoyant forces acting thereon.

A drag (friction) force generated by the propelled liquid acts in an opposite direction to the buoyancy force, whereby the gas bubbles rise at a reduced velocity than the rising velocity in still liquid, whereby the gas bubbles are exposed for a longer time to the liquid, resulting also in improving the alpha factor, as a consequence of which gas dissolving is improved, i.e. gas mass transfer to the liquid is improved.

The system and method according to the disclosed subject matter may be configured with any one or more of the following features, characters and designs:

- the tubular body may extend substantially vertically or at an angle (inclined), however such that the bottom end extends below liquid level;
- the gas bubbles may be discharged into the tubular body at or adjacent the bottom end of the tubular body or at any location below the liquid level within the liquid body;
- the liquid pump is fitted at or near a top end of the tubular body for drawing liquid from the liquid body and forcing it down the tubular body. Alternatively the liquid pump is immersed in the liquid body and liquid is propelled downwards through the tubular body by suction.
- the tubular body may be completely or partially immersed in the liquid body;
- a control system may be provided for governing various liquid/gas flow parameters, wherein a processor generates one or more control signals responsive to operation signals picked-up at one or more locations of the system, thereby monitoring and controlling the dissolving process;
- liquid emitted out through the bottom end of the tubular body acts to mix and homogenize the liquid in the liquid body;
- one or more of the liquid and gas are turbulated (caused to turbulate) to thereby increase gas/liquid exposure and respective dissolving;
- the tubular body may be positioned within the liquid body or external thereto, in which case a liquid inlet port and a liquid outlet port of the tubular body are in flow communication with the liquid body by suitable liquid conduit.
- the liquid inlet of the tubular body draws liquid from the liquid body at horizontal distance D from the liquid outlet port, wherein said distance D substantially reduces or prevents liquid egressing from the liquid outlet port to be sucked immediately into the inlet port;
- the tubular body is fitted with one or more liquid inlets extending below a top end of the tubular body, and below liquid level;
- one or more backup liquid pump and or gas source, or an alternative gas source (e.g. compressed gas reservoirs), are provided;
- The gas is pressurized at least to facilitate its delivery into the tubular body;
- a top end of the tubular body is fitted with a barrier to prevent scum and other matter from ingress into the tubular body;
- the tubular body has a circular cross-section. Other cross-section may be used as well, e.g. oval, rectangle, etc.;
- the tubular body is composed of two or more telescopic segments to thereby facilitate adjustment of its top end to liquid level within the liquid body. Alternatively, at least a top end of the tubular body is made of flexible material such that it is deformable to facilitate its top end to readily follow liquid level within the liquid body;
- one or more liquid/gas traps are provided along the tubular body for increasing contact area and duration of the gas with the liquid;
- one or more gas diffusers are provided for dispersing/scattering the gas into small bubbles. The gas diffusers may be of any suitable type or design, e.g. sparger-type, etc.;
- one or more flow diverters are provided along the tubular body for diverting fluid flow, where such flow diverters may be in the form of directional liquid/gas jets or in the form of mechanical interrupters, such as directional blades, forcing the liquid to divert its flow direction;
- the tubular body may be filled, at least partially, with packing material, for increasing contact surface area of the gas with the liquid;
- the tubular body may be configured as a regular cylinder or it may be configured as an upwards or downwards tapering tube, or have one or more segments tapering in either an upwards or downwards direction, or have a combined cross section (e.g. regular and tapering segments). Changes of the cross section of the tubular body result in changing liquid/gas flow characteristics, e.g. speed, turbulence, which result among others on bubble size. According to some particular example, the internal cross section of the tubular body is controllable and may be changed so as to comply with different flow parameters, for example by one or more inflatable sleeves received within the tubular body;
- the size of the bubbles diffused at the lower end of the tubular body may be controllable;
- parameters which result in dissolving rate are liquid propelling flow rate and pressure, gas discharge flow rate, gas bubble size, liquid/gas temperature, provision of gas traps within the tubular body, shape and cross-section of the tubular body, etc.;
- the gas is discharged into the tubular body continuously or intermittently, e.g. at different patterns or randomly;
- the tubular body may be fitted with one or more flow regulators, e.g. an array of fins, for 'straightening' and smoothening flow within the tube, at one or more sections thereof, to reduce turbulent effects.

The system is suitable for installing in a wastewater treatment plant as part of the aeration setup in said wastewater treatment plant, wherein the gas diffused at the bottom of end of the tubular body of the present invention is air from aeration blowers or compressors, and wherein the water body is an aeration tank for biological treatment of wastewater filled with water to be treated, and the dissolving of air in the wastewater provides oxygen for the metabolic process of the microorganisms used for biologically treating the water. Pumping of water downwards in the tubular body against the rising bubbles consumes little energy relative to aeration with freely rising bubbles in a water body. Furthermore, the system may be sized and installed to provide a portion of the air required for the processes of biologically treating the wastewater, and be operated in parallel and in conjunction with a convention aeration array.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
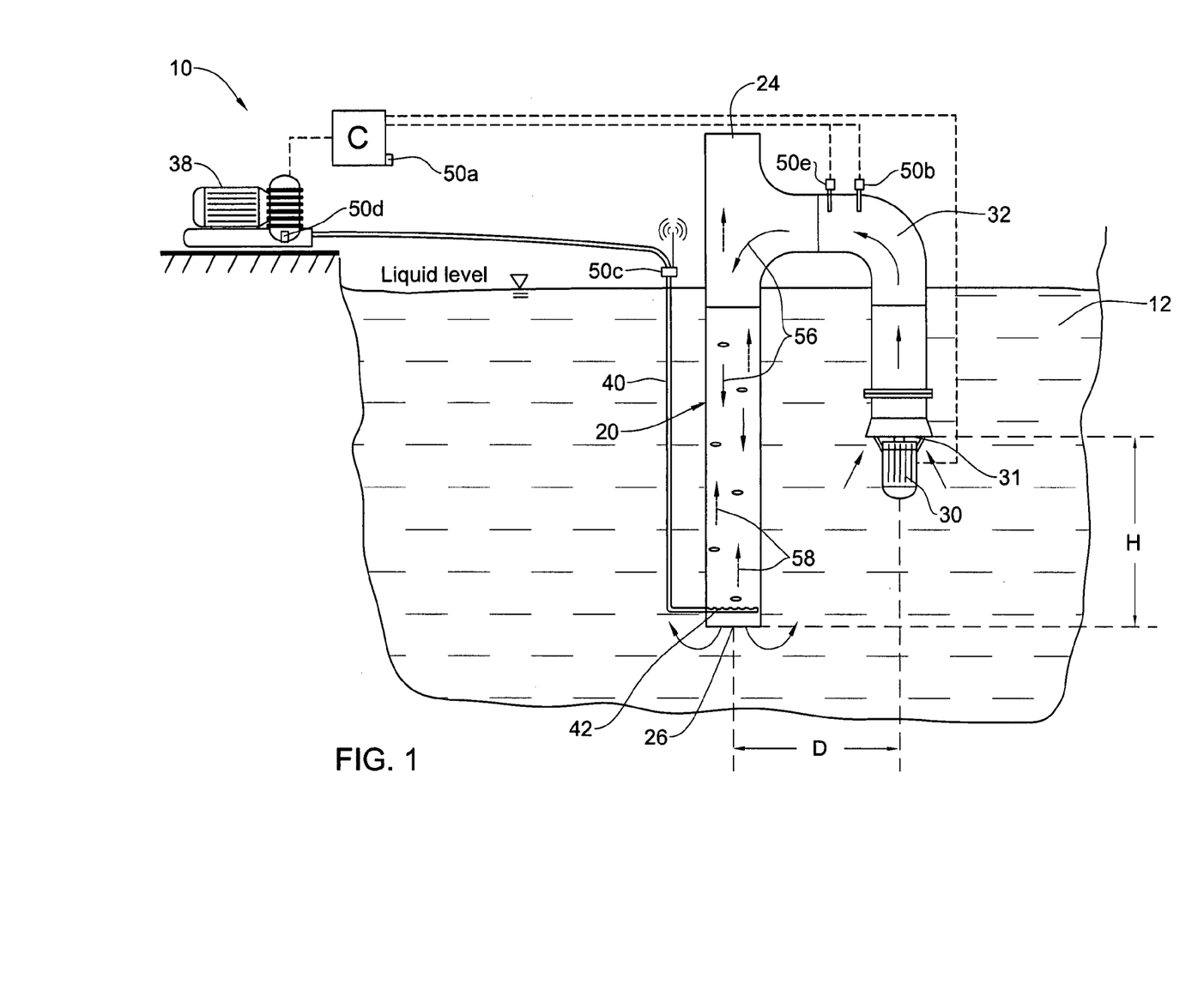
FIG. 1 is a schematic illustration of a system according to an example of the disclosed subject matter, wherein the liquid pump is coupled adjacent an inlet of the tubular body.

Attention is first directed to FIG. 1 of the drawings illustrating a dissolving system in accordance with the present invention generally designated 10, configured for dissolving of gas (oxygen resident at ambient air, in the present example), into a liquid received within a liquid body 12, a liquid reservoir in the present example, e.g. a sewage reservoir, or the like.

The system comprises a tubular body generally designated 20 substantially upright (vertically) extending, most of which immersed within the liquid body 12, however with an open top end 24 extending above liquid level and a liquid outlet port 26 immersed within the liquid body 12. A liquid pump 30 is immersed within the liquid body 12 and is in flow communication with an upper end of the tubular body 20 via a pipe segment 32. It is appreciated that according to a different example the top end 24 may be immersed as well. As will be noted hereinafter with reference to FIG. 6, the pump may also be external, i.e. fitted above the liquid.

Whilst in the following examples the tubular body is configured with a circular cross-section, it should be appreciated that other cross-sections may be used as well. Furthermore, as will be apparent herein after with reference to FIG. 8, the tubular body may extend within the liquid body at an inclined orientation, however such that the bottom end extends at a level below said top end.

A gas source 38 (namely compressor in the present example) mounted external to said liquid body 12, is coupled via a gas piping 40 to a bottom end of the tubular body 20, with a gas diffuser 42 fitted within said tubular body 20 for dissolving of gas into the liquid within tubular body 20. However, the gas source may just as well be a different source of compressed gas, e.g. compressed gas containers and the like.

A control system is provided for governing liquid and gas flow parameters, when a plurality of sensors are provided e.g. pump sensor 50a (for sensing various pump parameters such as RPM, liquid flow rate output, etc.) a flow sensor 50b fitted in pipe segment 32, gas sensor 50c for providing indication of gas flow rate within gas piping 40, gas source sensor 50d for indicating parameters concerned with the gas source 38 (e.g. flow rate, temperature, etc.), 50e dissolved gas sensor for measuring dissolved gas concentration in the liquid, wherein said sensors generate signals to the processor C which in turn generates control signals for controlling various flow parameters by governing respective drives/valves/actuators, thereby controlling parameters such as liquid flow rate (by governing operation of the pump 30) and gas supply (by governing operation of the gas source 38). It is appreciated that further sensors and controllers may be provided, e.g. for sensing liquid temperature, gas temperature, content of a specific gas within the gas discharge through top end 24 etc.

It is appreciated that control signals and sensor signals may be received/transmitted by wireless or by wire transmission.

In operation, the pump 30 sucks liquid through liquid inlet port 31, into the pipe segment 32 and then forces the liquid downwards in direction of arrowed lines 56, against the uprising gas bubbles discharged from the gas diffuser 42, said gas bubbles flowing upwards in direction of dashed arrowed lines 58, owing to buoyant forces acting thereon, thereby increasing exposure of the liquid flowing downwards against the uprising gas bubbles, increasing gas dissolving within the liquid. The gas eventually egresses through the open top end 24 and the liquid, now enriched with the dissolved gas, egressing through the bottom, liquid outlet port 26 returns to liquid body 12.

It is appreciated that the horizontal distance D (between the outlet port 26 and the inlet port 31) and the vertical distance H (between the outlet port 26 and the inlet port 31) are sufficient to reduce circulation of gas saturated liquid egressing through the outlet port 26 to flow directly towards the inlet port 31, thus increasing circulation within the liquid body 12.

Furthermore, it is noted that the gas is discharged through the gas diffuser 42 into the liquid within tubular body 20 continuously or intermittently, e.g. at different patterns or randomly. Furthermore, the gas may be discharged at constant or varying flow regimes (e.g. altering flow rate, discharge pressure, etc.)

Figure 2:
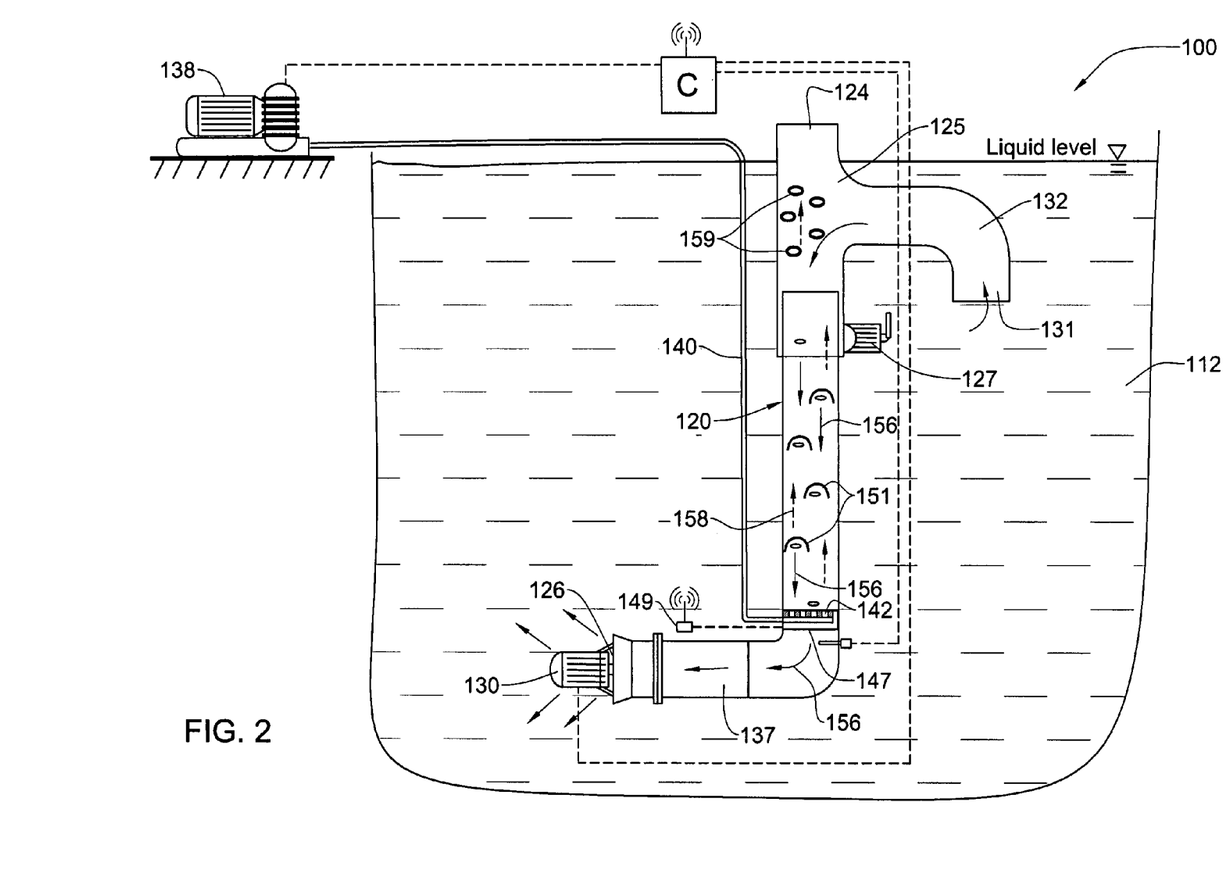
FIG. 2 is a schematic illustration of a system according to another example of the disclosed subject matter, wherein the liquid pump is coupled at an outlet of the tubular body, and with an extendible top end.

Turning now to FIG. 2 of the drawings, there is illustrated a system generally designated 100 wherein elements similar to those in connection with the example of FIG. 1 are designated with like reference numbers, however shifted by 100.

In the system of FIG. 2, the tubular body 120 is configured with a telescopic extension member 125 configured with a wireless remote controlled motor 127 for displacing the extension member 125 with respect to the tubular body 120 thereby changing the height of the top end 124 with respect to the liquid level within the liquid body 112.

It is further noticed that the pump 130 is fitted at an outlet port 126 extending at the end of an extension tube section 137 fitted at a lower end of the tubular body 120, and where the inlet port 131 is immersed within the liquid body, below liquid level (the elevation of the liquid inlet port 131 being controllable by vertical displacement of extension member 125 with respect to the tubular body 120, as explained hereinabove.

Furthermore, it is noticed that the liquid gas diffuser 142 is fitted with a gas diffusing module 147 controllable by a wireless control unit 149 which by means of a signal transmitted from controller C, changes the size of the bubbles emitted through said gas bubble diffuser 142.

In the present example, liquid is sucked by pump 130 through the inlet port 131 and downwards against the upwardly flowing gas bubbles (represented by dashed arrowed lines 158), where the liquid flowing downwards, (presented by arrowed lines 156) egresses through the outlet port 126, after dissolving of the gas thereto.

As can further be seen in FIG. 2, the tubular body 120 is of uniform, cylindrical cross section and is fitted with a plurality of gas traps 151 in the form of inverted U-like "pockets" entrapping gas therein, thus increasing duration of gas residing in the liquid, to thereby increase gas dissolving into the liquid.

Furthermore, in the particular example the tubular body 120 is configured with a plurality of liquid inlet apertures 159 at an upper portion of the tubular body to allow ingress of liquid directly into the tubular body 120 further to be propelled in a downwards direction along arrowed lines 156 by virtue of the pump 130.

Figure 3A:
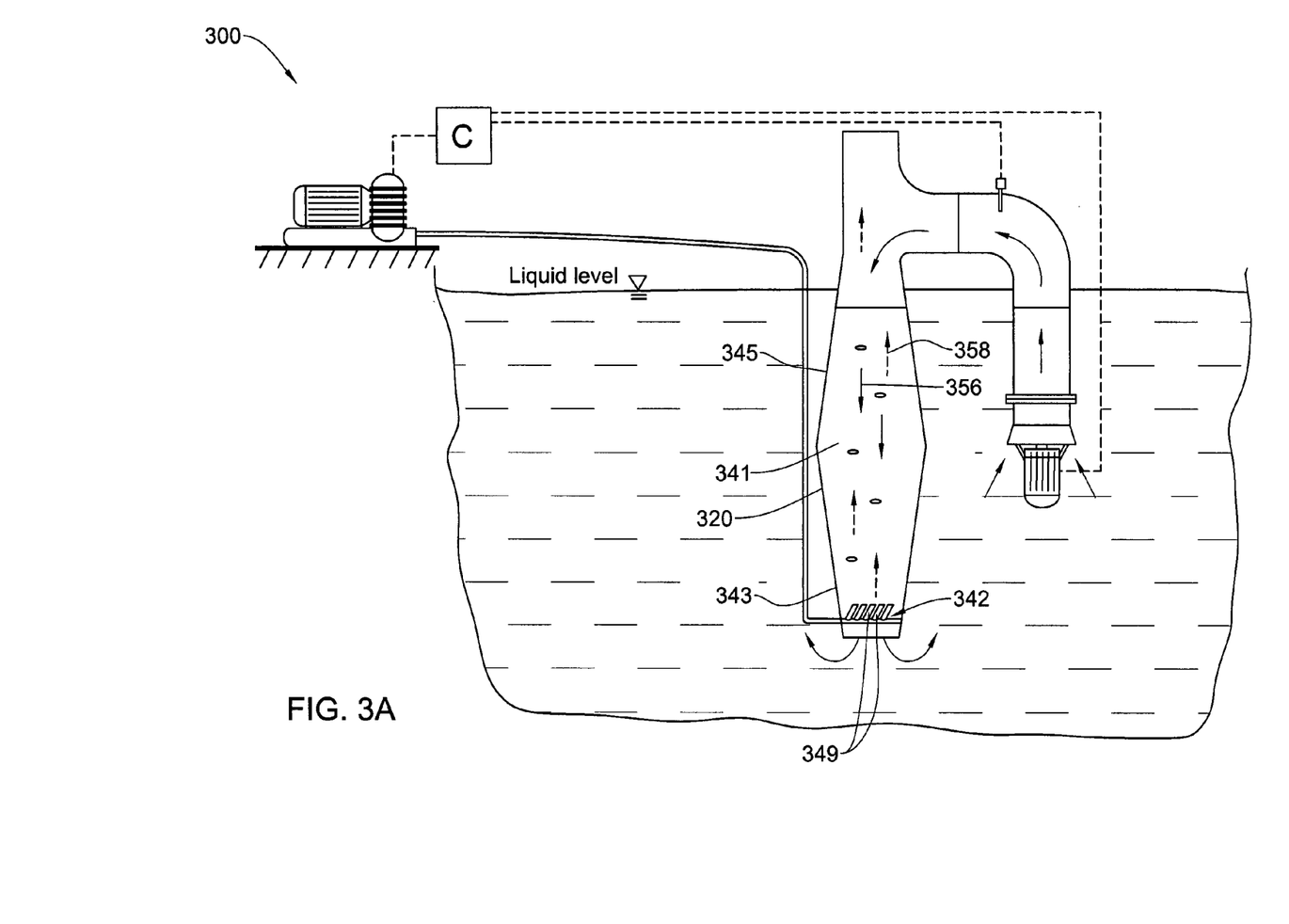
FIGS. 3A and 3B are schematic illustrations of a system according to yet other examples of the disclosed subject matter, illustrating modifications of the tubular body.
Figure 3B:
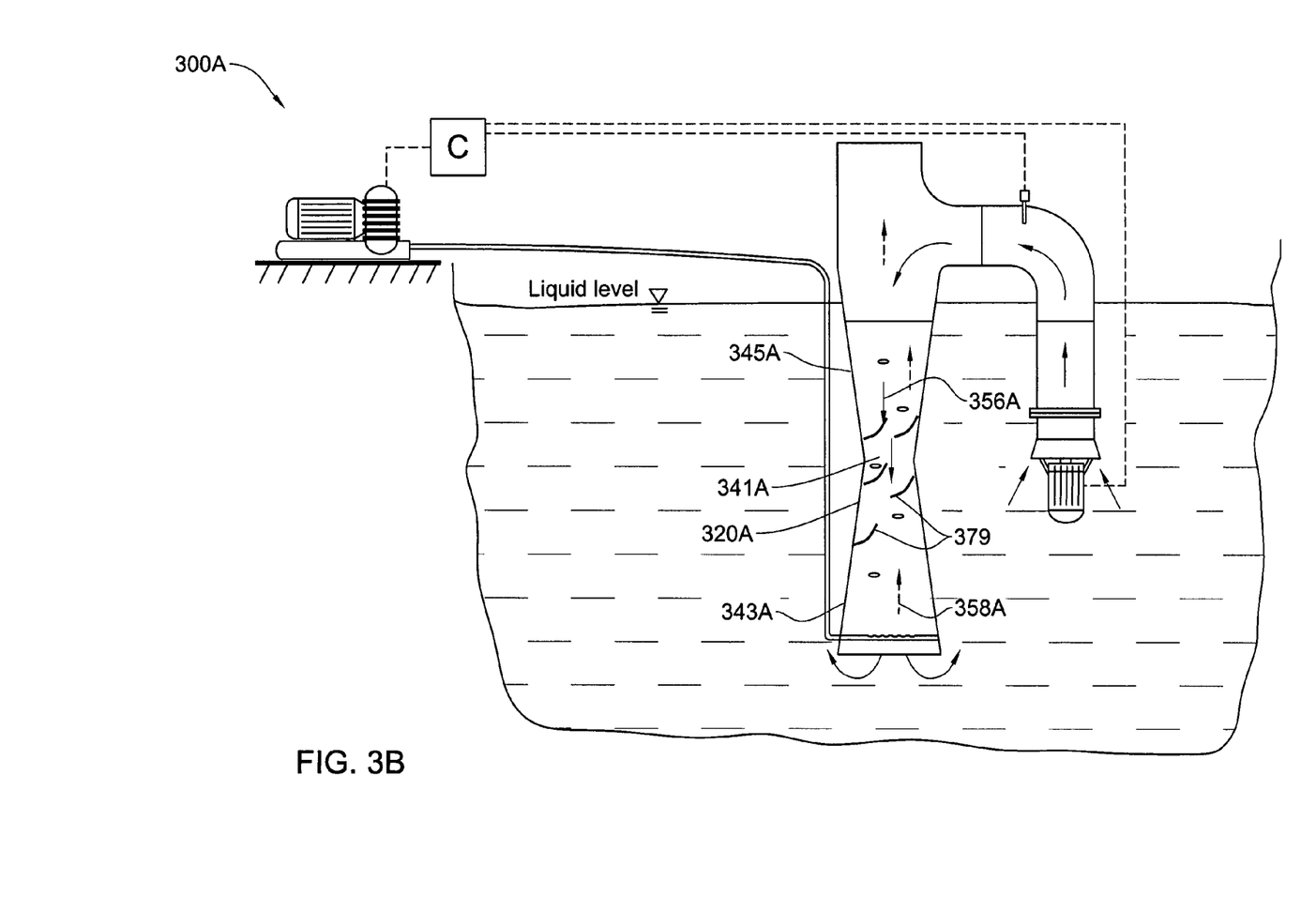

FIGS. 3A and 3B represent modification of examples of a gas dissolving system in accordance with the disclosed subject matter, the systems being substantially similar to that disclosed in connection with FIG. 1 as far as structure and operation, and wherein like elements have been designated with like reference numbers, however shifted by 300.

In the example of FIG. 3A, the tubular body 320 has a circular cross section, though it comprises a lower downwardly tapering segment 343 and a top upwardly tapering segment 345 resulting in that a central portion 341 of the tubular body 320 has an increased diameter wherein fluid speed within said section reduces.

Yet, as seen in the example of FIG. 3A, the gas diffuser 342 is provided with directional outlet nozzles 342 for emitting gas bubbles with some angular velocity.

However, in the example of FIG. 3B, the system 300A comprises a tubular body 320A wherein a lower portion 343A tapers upwardly and an upper portion 345A tapers downwardly, said portions conjoining at a narrowed central portion 225, resulting in increased speed of fluid at said section.

Further noted, in FIG. 3B the tubular body 320A is fitted with a plurality of liquid flow breakers 379, in the form of fins extending from an inside wall of the tubular body, or alternatively mounted on a support structure extending within the tubular body 320A, for interrupting and diverting the liquid flow within the tubular body, however retaining its downwards flow against the uprising bubbles. For example, the fins 379 may impart the liquid a turbulent or helical flow pattern.

Figure 4:
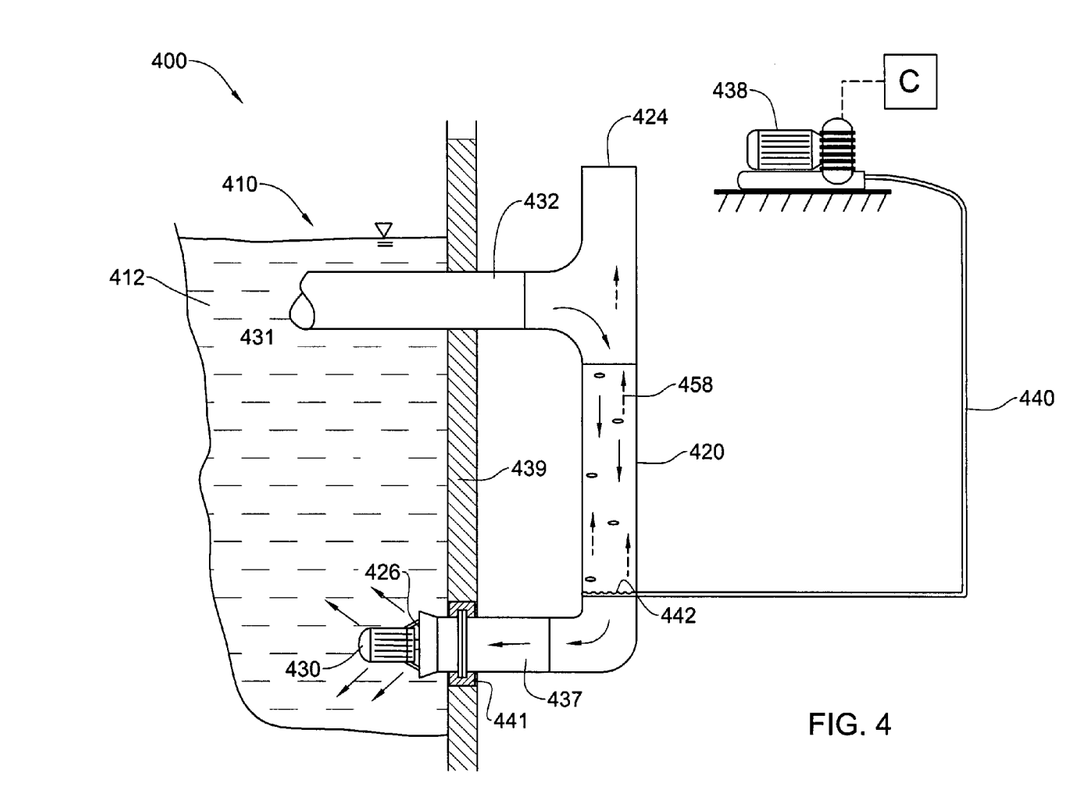
FIG. 4 is a schematic illustration of a system according to another example of the disclosed subject matter, wherein the tubular body is mounted external of a liquid body.

In the example of FIG. 4, dissolving system in accordance with an example of the present invention is illustrated and designated with like reference numbers as in FIG. 1, however shifted by 400.

In the present example, the dissolving system 400, namely the tubular body 420 extends outside of the liquid body 412, wherein the liquid pump 430 is mounted at a liquid outlet port 426 extending at an end of an extension tube section 437 extending into the liquid body 412 with suitable sealing arrangements 441 maintaining the tubular body 420 at a so-called dry zone behind a wall member 439. An inlet port 431 extends within the liquid body 412 (e.g. a sewage reservoir etc.) and extends by an extension pipe segment 432 towards the top end of the tubular body 420, with an open top end 424 opened to the atmosphere.

A gas source 438 is provided for compressing gas along gas piping 440 towards the gas diffuser 442 with suitable control means as discussed hereinbefore. The arrangement of the example disclosed in FIG. 4 operates in the same manner along the concept of the disclosed subject matter, namely liquid as sucked by pump 430 through inlet port 431, and is forced downwardly along the tubular body 420, against the upward flowing gas bubbles in direction of arrows 458, wherein liquid returns to the reservoir (liquid body 412) through liquid outlet port 426 and excessive gas/air exits to the atmosphere through the top end 424.

The arrangement disclosed in connection with FIG. 4 has the advantage of maintaining the tubular body 420 in a so-called dry environment, to facilitate easy accessibility thereto for maintenance and monitoring purposes.

Figure 5A:
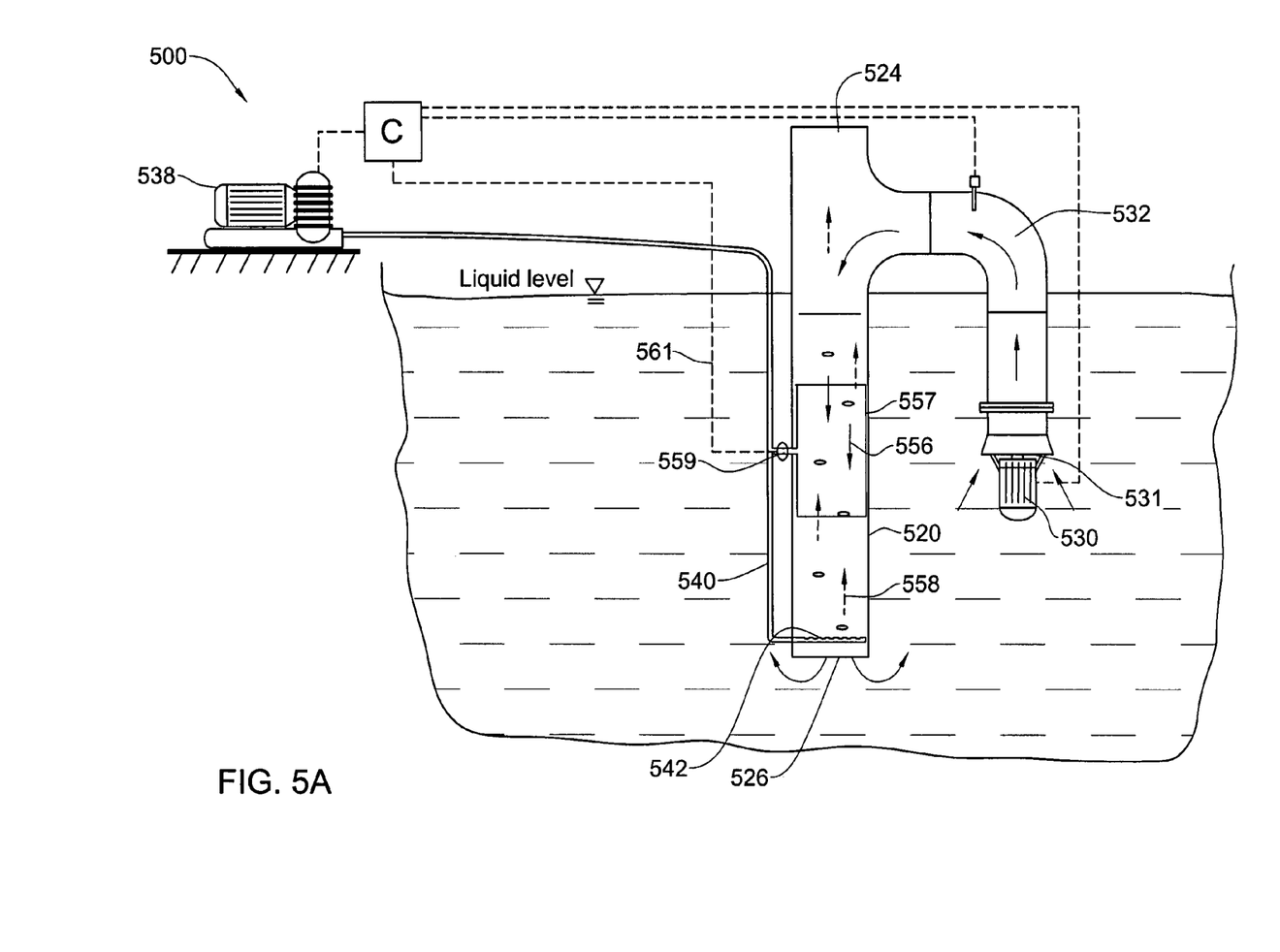
FIGS. 5A and 5B are schematic illustrations of a system according to yet other examples of the disclosed subject matter, wherein the tubular body is fitted with a dynamic segment.
Figure 5B:
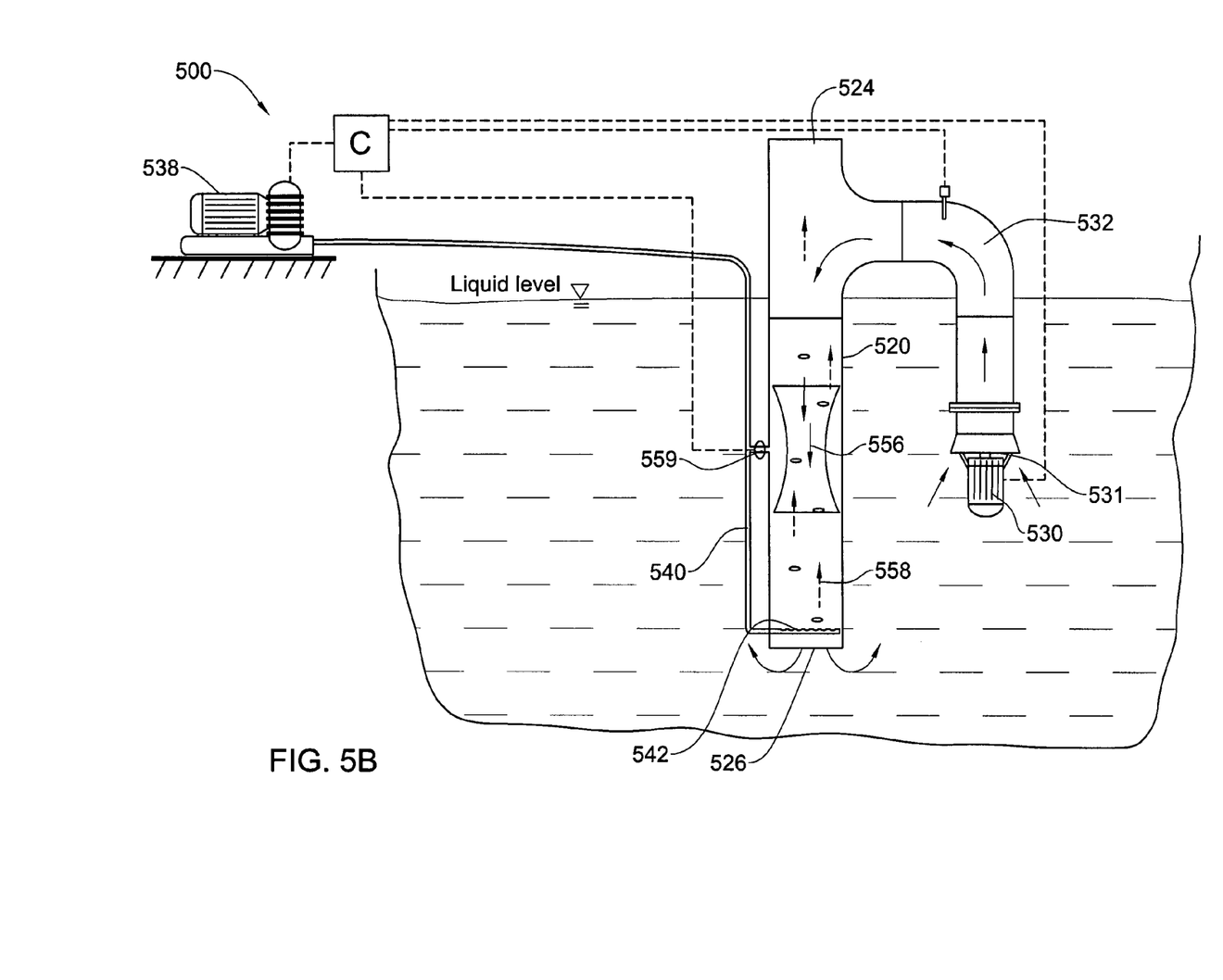

FIGS. 5A and 5B disclose yet another example of a system in accordance with the present invention generally designated 500 following the principles of the previously disclosed examples, and wherein like elements are designated with like reference numbers as in FIG. 1, however shifted by 500.

In this example, the tubular body 520 is fitted at its interior with a section converter 557 in the form of an inflatable sleeve secured within the inside of the tubular body 520, wherein section converter 557 is selectively inflatable/deflatable through a gas valve 559 coupled to the controller C by control line 561.

By generating an appropriate control signal, the valve 559 (which is also coupled to the pressurized gas piping 540, though according to another example may be connected to the gas source 538 via independent tubing or to a totally separate gas inflation system) opens to facilitate gas flow into the section converter 557 to thereby inflate (FIG. 5B) restricting the cross section of the tubular body 520, thereby increasing fluid flow velocity through said section. However, upon generating an opposite signal to the valve 559, gas will discharge out to facilitate deflation of the section converter 557 (FIG. 5A) thus obtaining the regular flow parameters through the tubular body 520. it is however appreciated that rather than gas pressure the section converter sleeve may be manipulated by any flowable material, e.g. liquids.

Figure 6:
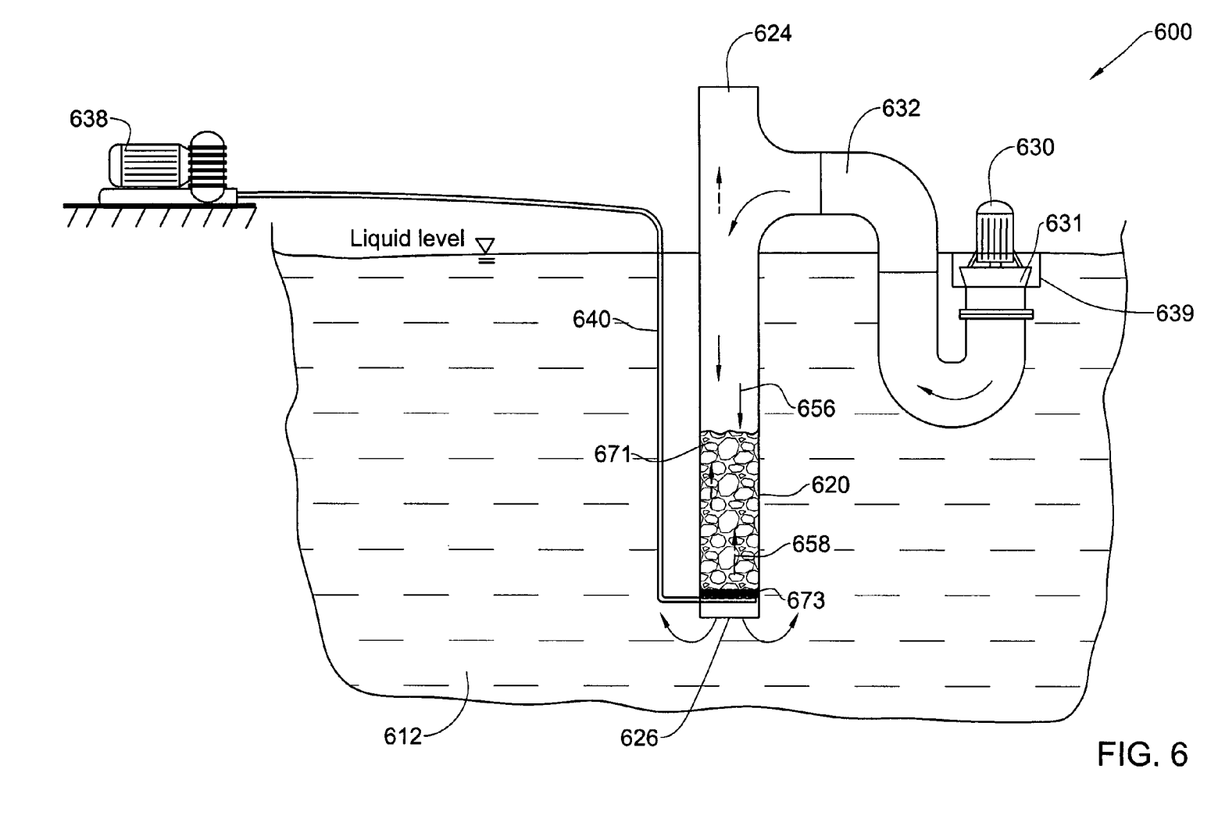
FIG. 6 is a schematic illustration of yet an example of a system according to the disclosed subject matter.

In the example of FIG. 6 there is illustrated yet another system in accordance with the present invention generally designated 600 and wherein like elements as in FIG. 1 are designated with like reference numbers, however shifted by 600.

According to the example of FIG. 6, the tubular body 620 is coupled to a liquid propelling pump 630 via an intermediate pipe segment 632, wherein the pump is fitted at an inlet port 631 of the system extending substantially at liquid level and further fitted with a barrier 639 configured to prevent scum from ingress into the tubular body. The barrier 639 may be fitted with an appropriate filtering arrangement to further improve excluding of dirt from entering into the tubular body 620.

In the example of FIG. 6, the tubular body 620 is filled, at least partially, with at least one layer of packing material 671 resting over a packing support 673, for increasing contact surface area of the gas with the liquid.

Figure 7:
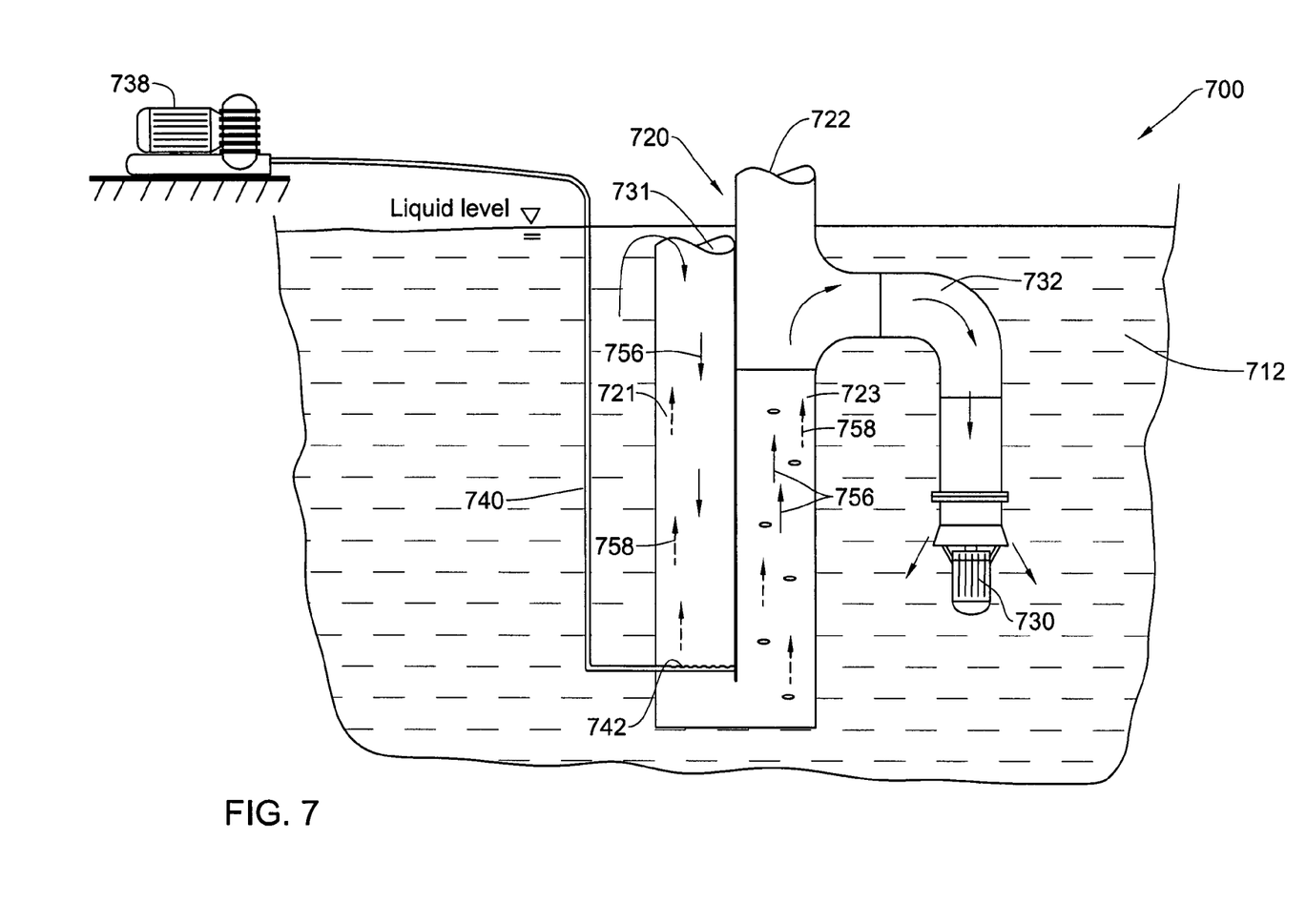
FIG. 7 is a schematic illustration of a modification of a tubular body of a system according to the disclosed subject matter.

FIG. 7 illustrates another example of a system according to the present matter generally designated 700, wherein like elements as in FIG. 1 are designated with like reference numbers, however shifted by 700.

The system 700 differs from the previous examples in that the tubular body 720 is configured as a U-like tube having an inlet segment 721 and an outlet segment 723, both extending substantially upright. The inlet segment has an inlet 731 extending below liquid level and its bottom end is in flow communication with the outlet segment 723, wherein a top end 722 thereof extends above liquid level and a pump 730 is provided for liquid withdrawal via pipe segment 732.

A gas source 738 is provided for compressing gas through gas diffuser 742 at a lower portion of the inlet segment 721.

The arrangement is such that pump 730 sucks in liquid through inlet port 731 and propels it through the inlet segment 721 and than through the outlet segment 723 and out through pipe segment 732, whilst it is noted that the liquid flows in the inlet segment 721 against the upwardly flowing gas bubbles discharged through gas diffuser 742.

It is appreciated that the U-like tube configuration may assume other configurations. For example, the inlet segment and the outlet segment may be separated from one another, or may extend inclined within the liquid body 712.

Figure 8:
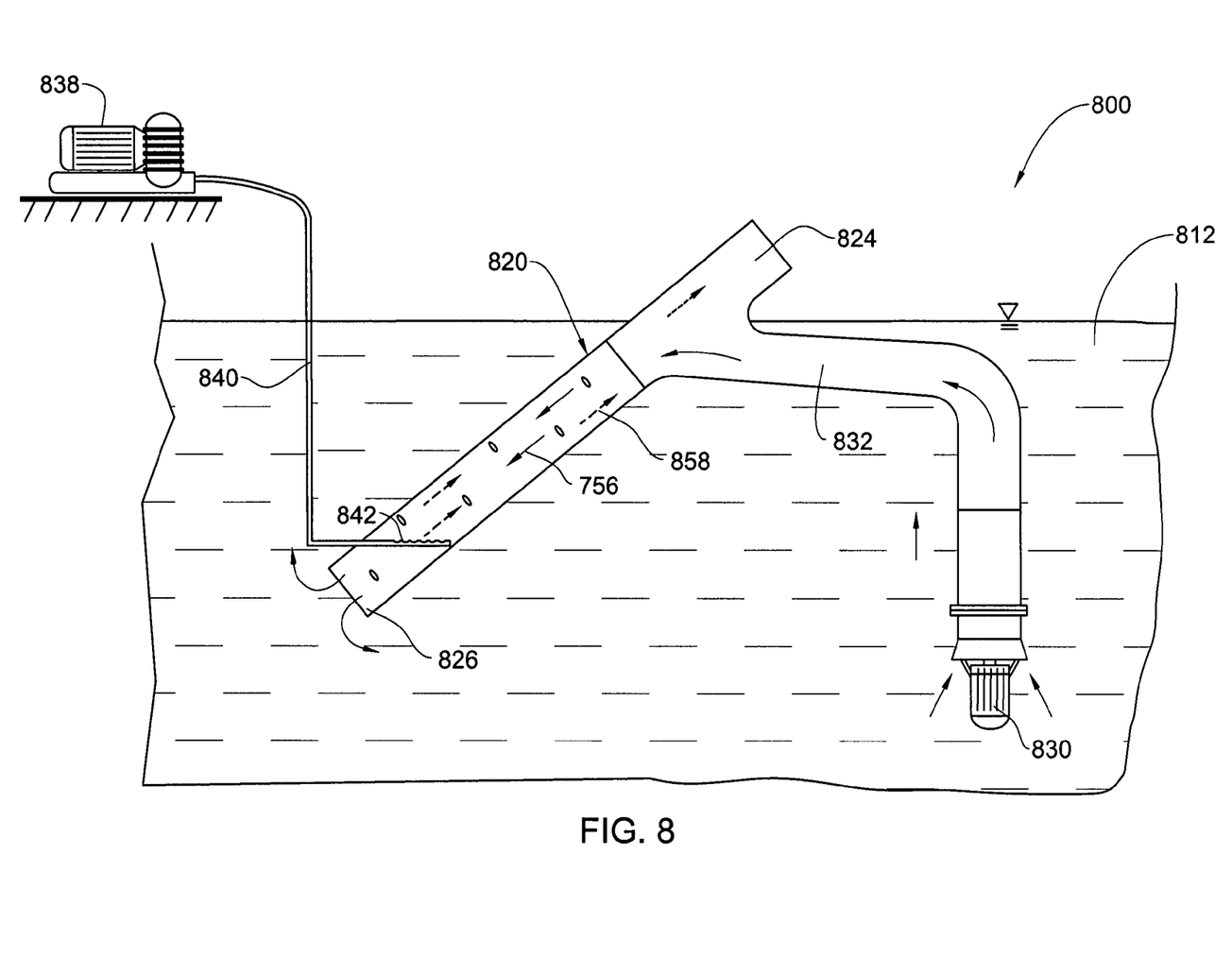
FIG. 8 is a schematic illustration of another example of a system according to the disclosed subject matter, wherein the tubular body extends inclined within the liquid body.

The example of FIG. 8 is similar to that disclosed in connection with FIG. 1 and like elements are designated with like reference numbers, however shifted by 800.

The system, generally designated 800 comprises a tubular body generally designated 820 extending inclined within the liquid body 812, such that the inlet end an open top end 824 extends above liquid level and a liquid outlet port 826 is immersed within the liquid body 812.

A liquid pump 830 is immersed within the liquid body 812 and is in flow communication with an upper end of the tubular body 820 via a pipe segment 832. A gas source 838 is coupled via a gas piping 840 near a bottom end of the tubular body 820, with a gas diffuser 842 fitted within said tubular body 820 for dissolving of gas bubbles.

Operation of the gas dissolving system 800 is similar to that disclosed in connection with the previous examples, and in particular the example of FIG. 1, and reference is made thereto.

Figure 9:
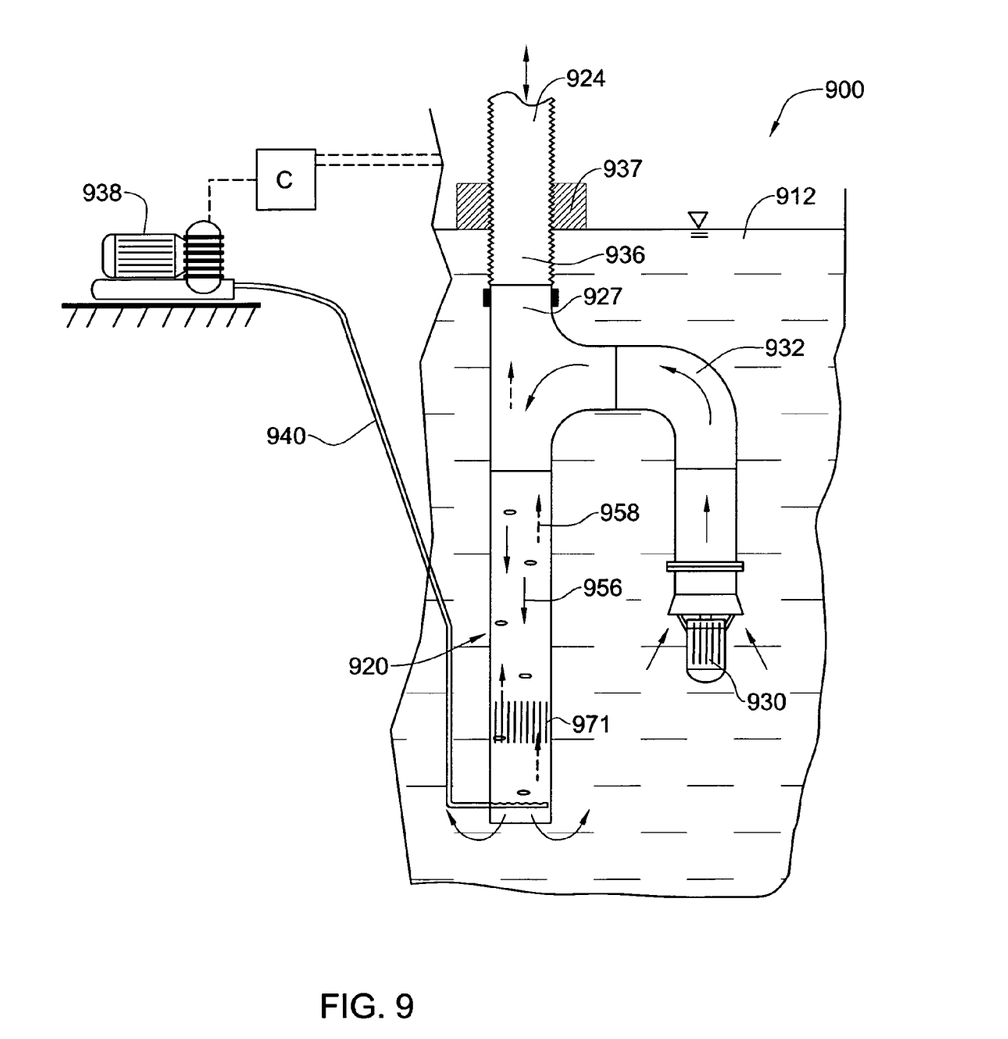
FIG. 9 is a schematic illustration of another example of a system according to the disclosed subject matter, wherein the tubular body is fitted with an extendible top segment.

With reference now being made to FIG. 9 of the drawings there is illustrated yet another example of a dissolving system generally designated 900, designated with like reference numbers as in FIG. 1, however shifted by 900.

The system 900 resembles that disclosed in FIG. 1, however differentiated in that at a top end of the tubular body 920 there is an extension segment 936 configured for retraction/expansion as may be the case, in order to ensure the top end 924 remains above liquid level. For example, the extension segment 936 may be a flexible bellows-type segment fixedly fitted over an end 927 of the tubular body 920, and fixedly fitted with a buoy 937, thus ensuring that the top end 924 is above liquid level by respective lengthening of the extension segment 936 upon liquid level rise, and respective contraction of the extension segment 936 upon liquid level drop, where the top end 924 remains at substantially a fixed level above liquid level.

Further noted, the system 900 illustrated in FIG. 9 is configured with a flow regulating mechanism, wherein the tubular body 920 is configured with a flow regulator 971 in the form of an array of upright extending fins, for 'straightening' and smoothening flow within the tubular body 920, e.g. to reduce turbulent effect. It is noted that one or more such flow regulators may be provided at one or more sections of the tubular body Those skilled in the art to which this invention pertains will readily appreciate that numerous changes, variations, and modifications can be made without departing from the scope of the invention, mutatis mutandis.

The invention claimed is:

1. A system for dissolving gas into liquid contained within a liquid body, the system comprising:
    a tubular body extending between a bottom end and a top end, the tubular body fitted with one or more liquid inlets extending below the top end;
    a gas diffuser coupleable to a gas source and configured for discharging gas bubbles into the tubular body;
    and a liquid pump for propelling liquid within the tubular body in a downwards direction, against uprising gas bubbles, where the liquid egressing at the bottom end of the tubular body, and
    wherein the tubular body is substantially immersed within the liquid body.

2. The system according to claim 1, wherein the liquid pump is fitted near or at a top end or a bottom end of the tubular body.

3. The system according to claim 1, wherein the liquid pump is fitted near a top end of the tubular body for drawing liquid from the liquid body and propelling it down the tubular body.

4. The system according to claim 1, wherein the liquid pump is immersed in the liquid body at or near a bottom end of the tubular body, and wherein liquid is drawn from the liquid body and propelled downwards through the tubular body by suction.

5. The system according to claim 1, further comprising a control system for governing liquid and/or gas flow parameters.

6. The system according to claim 1, wherein the tubular body comprising two or more segments to facilitate adjustment of the top end to a liquid level within the liquid body.

7. The system according to claim 1, wherein one or more flow regulators are provided for smoothening flow within at least one or more section the tube.

8. The system according to claim 1, wherein one or more gas diffusers are provided for dispersing the gas into small bubbles.

9. The system according to claim 1, wherein one or more flow diverters are provided along the tubular body for diverting liquid flow.

10. The system according to claim 1, wherein the tubular body is configured with one or more tapering segments.

11. The system according to claim 9, wherein the liquid diverters are selected from the group consisting of fluid jets and mechanical interrupters to force the liquid to divert its flow direction.

12. The system according to claim 11, wherein the mechanical interrupters comprise directional blades.

13. A method for dissolving a gas into a liquid contained within a liquid body, the method comprising:
    providing a system for dissolving gas into liquid contained within a liquid body, the system comprising a tubular body extending between a bottom end and a top end, the tubular body fitted with one or more liquid inlets extending below the top end, a gas diffuser coupleable to a gas source and configured for discharging gas bubbles into the tubular body, and a liquid pump for propelling liquid within the tubular body in a downwards direction, against uprising gas bubbles, where the liquid egressing at the bottom end of the tubular body;
    discharging gas bubbles into the tubular body; and
    propelling the liquid within the tubular body in a downwards direction, against uprising gas bubbles, wherein the tubular body is substantially immersed within the liquid body.

14. The method according to claim 13, wherein the tubular body comprises a liquid inlet port near the top end and a liquid outlet port at the bottom end, both being in flow communication with the liquid body;
    discharging gas bubbles into the tubular body;
    propelling the liquid within the tubular body in a downwards direction, against the uprising gas bubbles; and
    discharging liquid to the liquid body through the outlet port.

15. A system for dissolving gas into liquid contained within a liquid body, the system comprising:
    a tubular body extending between a bottom end and a top end, the tubular body comprising two or more segments configured to facilitate adjustment of the top end to a liquid level within the liquid body;

a gas diffuser coupleable to a gas source and configured for discharging gas bubbles into the tubular body; and a liquid pump for propelling liquid within the tubular body in a downwards direction, against uprising gas bubbles, where the liquid egressing at the bottom end of the tubular body, wherein the tubular body is substantially immersed within the liquid body.

16. The system according to claim 15, wherein the liquid pump is fitted near or at a top end or a bottom end of the tubular body.

17. The system according to claim 15, further comprising a control system for governing liquid and/or gas flow parameters.

18. The system according to claim 15, wherein one or more flow diverters are provided along the tubular body for diverting liquid flow.

19. The system according to claim 15, wherein the tubular body is fitted with one or more liquid inlets extending below a top end of the tubular body.

20. A system for dissolving gas into liquid contained within a liquid body, the system comprising:

a tubular body extending between a bottom end and a top end;

a gas diffuser coupleable to a gas source and configured for discharging gas bubbles into the tubular body;

and a liquid pump for propelling liquid within the tubular body in a downwards direction, against uprising gas bubbles, where the liquid egressing at the bottom end of the tubular body; and one or more flow regulators for smoothening flow within at least one or more sections of the tubular body, wherein the tubular body is substantially immersed within the liquid body.

21. The system according to claim 20, wherein the liquid pump is fitted near or at a top end or a bottom end of the tubular body.

22. The system according to claim 20, further comprising a control system for governing liquid and/or gas flow parameters.

23. The system according to claim 20, wherein one or more flow diverters are provided along the tubular body for diverting liquid flow.

24. A system for dissolving gas into liquid contained within a liquid body, the system comprising:

a tubular body extending between a bottom end and a top end;

a gas diffuser coupleable to a gas source and configured for discharging gas bubbles into the tubular body;

and a liquid pump for propelling liquid within the tubular body in a downwards direction, against uprising gas bubbles, where the liquid egressing at the bottom end of the tubular body; and one or more flow diverters provided along the tubular body for diverting liquid flow, wherein the tubular body is substantially immersed within the liquid body.

25. The system according to claim 24, wherein the liquid pump is fitted near or at a top end or a bottom end of the tubular body.

26. The system according to claim 24, further comprising a control system for governing liquid and/or gas flow parameters.

27. The system according to claim 24, wherein one or more flow diverters are provided along the tubular body for diverting liquid flow.

* * * * *